Jan. 15, 1957 C. L. KLEEM 2,777,527
TRACTION DEVICE FOR MOTOR VEHICLES
Filed March 17, 1954

INVENTOR
CLIFFORD L. KLEEM

United States Patent Office 2,777,527
Patented Jan. 15, 1957

2,777,527

TRACTION DEVICE FOR MOTOR VEHICLES

Clifford Leslie Kleem, Young, New South Wales, Australia, assignor to Reginald Brian Omant and Robert Ian Grant, both of Young, New South Wales, Australia Application March 17, 1954, Serial No. 416,829

Claims priority, application Australia March 27, 1953

2 Claims. (Cl. 180—7)

This invention has been devised to provide means attachable to the driving wheels of motor vehicles whereby vehicle power can be utilized to lift a wheel or wheels and move the vehicle a short distance while the wheel or wheels is or are raised. The means are useful to extricate vehicles which have become bogged and particularly tractors and vehicles used in fields.

According to this invention the driving wheels of vehicles have means adapted for attachment to the outer side thereof which will support rods so that one end of each rod will project beyond the perimeter of the tire outwardly in the direction of travel of the vehicle. The projecting end of each rod has a foot thereon. The rods can be removed when not required. The assembly is such that when the wheels are rotated one or both feet as may be required will bear on the ground, lift a wheel or wheels and move the vehicle a distance determined by the length of the projecting end of the rod or rods.

Figure 1:
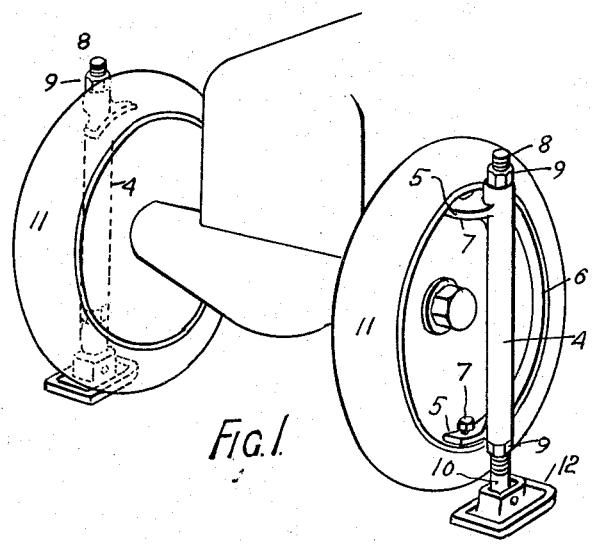
Figure 2:
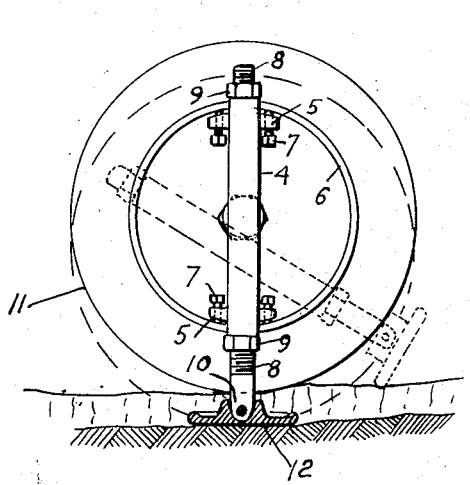
Figure 3:
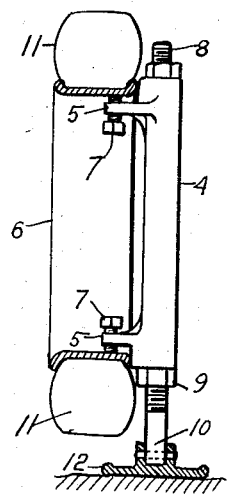

One embodiment of the invention is illustrated in the annexed drawings wherein Fig. 1 is a fragmentary perspective view of a tractor showing one manner of attaching the lifting means to the driving wheels; Fig. 2 is a side elevation of a wheel elevated from the position shown in dotted lines by the lifting means of this invention; Fig. 3 is a sectional elevation of a wheel showing further detail of the lifting means.

In this embodiment a tube 4 has a bracket 5 near each end. The tube 4 illustrated is a little longer than the diameter of the wheel rim 6 but is necessarily shorter than the length of the overall diameter of the wheel. The brackets 5 are constructed to project within the plane of the rim edge. Each bracket is drilled and screwed to take studs 7 whereby the tube is secured to the wheel rim 6 diametrically across the wheel.

A rod 8 adapted to slide through the tube 4 is threaded to take nuts whereby the rod is adjustably secured in the tube 4. In use the end 10 of the rod projects beyond the perimeter of the wheel tire 11. This end has a foot 12 pivotally secured thereto. The foot is adapted to contact the ground and as the wheel is rotated the rod lifts and lowers the wheel in an arcuate movement.

It is to be understood that the invention is not confined to the construction described and illustrated. Further the invention is not confined to one rod and its associated parts for each wheel.

I claim:

1. A device for lifting a vehicle wheel including a rim, upon power rotation thereof, comprising: a tube, means adjacent each end of said tube disposable within the rim and rigidly engageable therewith for supporting the tube diametrically of the rim, a rod slidably mounted in said tube and being threaded adjacent each end thereof, a nut supported on each threaded end of the rod and being engageable with a corresponding end of the tube for adjustment of the rod whereby one end thereof projects beyond the periphery of the wheel, and a road engaging foot pivotally connected to said one end of the rod.

2. A device according to claim 1, wherein said tube is of a length for bearing engagement of each end thereof, with a side of the rim, and said means comprises a bracket rigid with said tube and projecting radially thereof adjacent each end thereof, and a pair of rim engaging studs threaded into each bracket.

References Cited in the file of this patent

UNITED STATES PATENTS

| 2,548,944 | Chapman | Apr. 17, 1951 |
| 2,553,281 | Roth | May 15, 1951 |

FOREIGN PATENTS

| 808,636 | Germany | July 16, 1951 |